(12) United States Patent
Boxey et al.

(10) Patent No.: US 7,850,202 B2
(45) Date of Patent: Dec. 14, 2010

(54) INFLATABLE CURTAIN

(75) Inventors: Kevin J. Boxey, Columbiaville, MI (US); Kevin L. Ruedisueli, Oxford, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 386 days.

(21) Appl. No.: 11/713,753

(22) Filed: Mar. 2, 2007

(65) Prior Publication Data

US 2008/0211211 A1 Sep. 4, 2008

(51) Int. Cl.
*B60R 21/26* (2006.01)
(52) U.S. Cl. ............... 280/742; 280/728.2; 280/730.1; 280/730.2; 280/736; 280/740
(58) Field of Classification Search .............. 280/728.2, 280/730.1, 730.2, 736, 740, 742
See application file for complete search history.

(56) References Cited

U.S. PATENT DOCUMENTS

| | | | | |
|---|---|---|---|---|
| 5,487,556 A * | 1/1996 | Jenkins et al. | ........... | 280/728.2 |
| 5,667,241 A * | 9/1997 | Bunker et al. | ........... | 280/730.2 |
| 5,690,354 A * | 11/1997 | Logan et al. | ........... | 280/728.2 |
| 5,700,028 A * | 12/1997 | Logan et al. | ........... | 280/728.2 |
| 5,803,488 A * | 9/1998 | Bailey et al. | ........... | 280/728.2 |
| 5,806,882 A * | 9/1998 | Stein et al. | ........... | 280/730.2 |
| 5,833,266 A * | 11/1998 | Bartoldus et al. | ........... | 280/743.1 |
| 6,010,149 A * | 1/2000 | Riedel et al. | ........... | 280/730.2 |
| 6,082,761 A * | 7/2000 | Kato et al. | ........... | 280/730.2 |
| 6,103,984 A * | 8/2000 | Bowers et al. | ........... | 280/730.2 |
| 6,106,007 A * | 8/2000 | Kretschmer et al. | ........... | 280/730.2 |
| 6,135,492 A * | 10/2000 | Zimmerbeutel et al. | .. | 280/730.2 |
| 6,164,688 A | 12/2000 | Einsiedel et al. | | |
| 6,224,089 B1 * | 5/2001 | Uchiyama et al. | ........... | 280/728.2 |
| 6,237,937 B1 * | 5/2001 | Kokeguchi et al. | ....... | 280/730.2 |
| 6,412,810 B1 * | 7/2002 | Wipasuramonton et al. | ........... | 280/730.2 |
| 6,431,586 B1 * | 8/2002 | Eyrainer et al. | ........... | 280/730.1 |
| 6,851,707 B2 * | 2/2005 | Bakhsh et al. | ........... | 280/730.2 |
| 6,860,507 B2 * | 3/2005 | Uchiyama et al. | ........ | 280/730.2 |
| 6,945,554 B2 * | 9/2005 | Henderson et al. | ....... | 280/728.2 |
| 7,125,038 B2 * | 10/2006 | Gammill | ................... | 280/728.2 |
| 7,357,414 B2 * | 4/2008 | Huperz | ........................ | 280/740 |
| 7,404,571 B2 * | 7/2008 | Stevens | .................... | 280/728.2 |
| 2003/0015862 A1 * | 1/2003 | Jost | ........................... | 280/730.2 |
| 2005/0017489 A1 * | 1/2005 | Huperz | ........................ | 280/736 |

(Continued)

FOREIGN PATENT DOCUMENTS

DE        10133086 C1 *   1/2003

*Primary Examiner*—Lesley D Morris
*Assistant Examiner*—Barry Gooden, Jr.
(74) *Attorney, Agent, or Firm*—Tarolli, Sundheim, Covell & Tummino LLP

(57) ABSTRACT

Apparatus (10) for helping to protect an occupant (28) of a vehicle (12) that has a side structure (16) and a roof (18). The apparatus (10) includes an inflatable occupant protection device (14) that is inflatable away from the vehicle roof (18) to a position between the side structure (16) of the vehicle (12) and the vehicle occupant (28). The apparatus (10) further includes a fill tube (22) for delivering inflation fluid to the protection device (14). The protection device (14) includes an opening (104) through which the fill tube (22) extends and a portion (106) adjacent the opening that forms a friction fit around the fill tube (22). The friction fit forms an effective seal for preventing inflation fluid leakage through the opening (104).

22 Claims, 5 Drawing Sheets

U.S. PATENT DOCUMENTS

2005/0077709 A1* 4/2005 Hofmann et al. ......... 280/730.2
2007/0035112 A1* 2/2007 Takahara ................. 280/730.2
2007/0284859 A1* 12/2007 Kashiwagi ............... 280/730.2

* cited by examiner

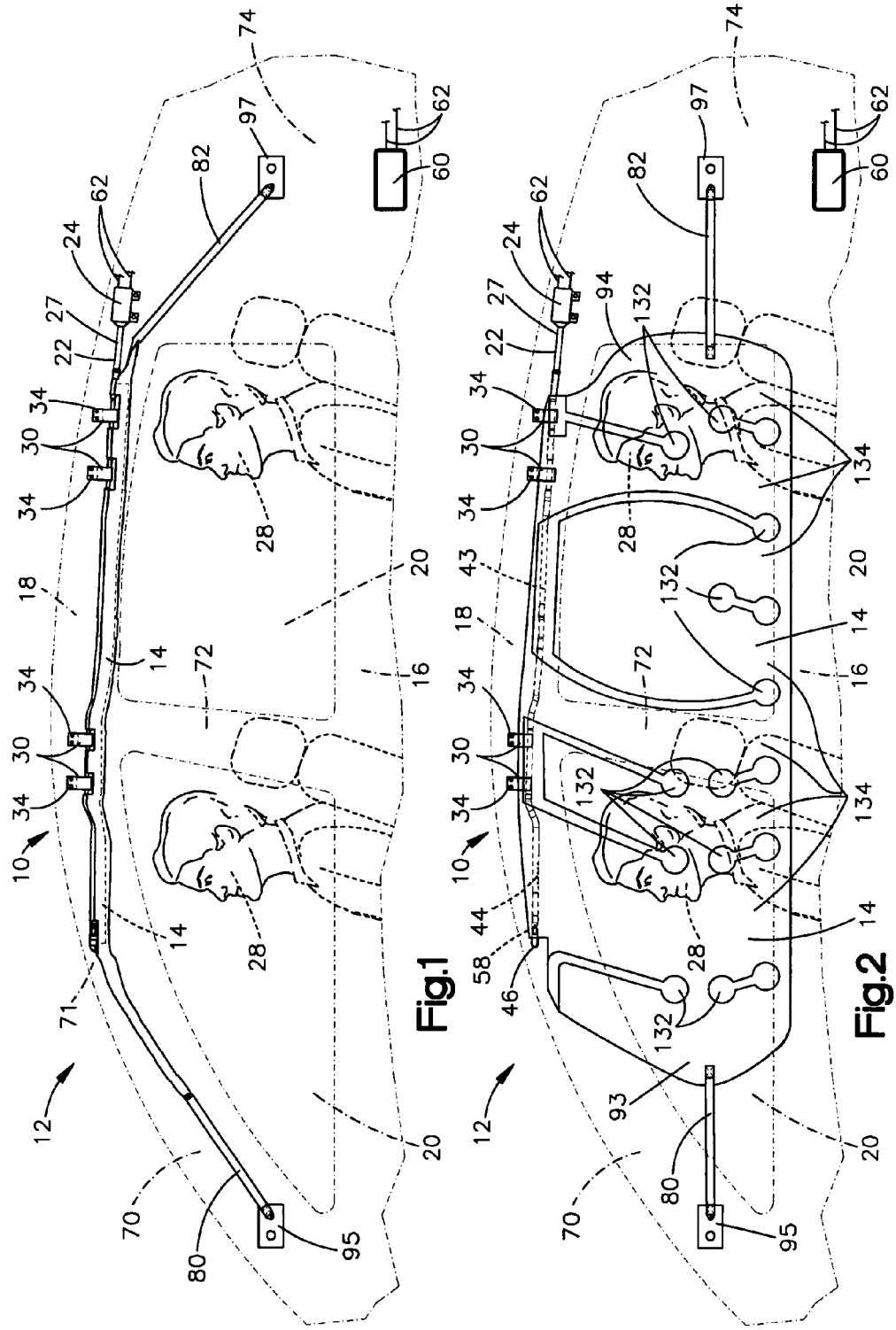

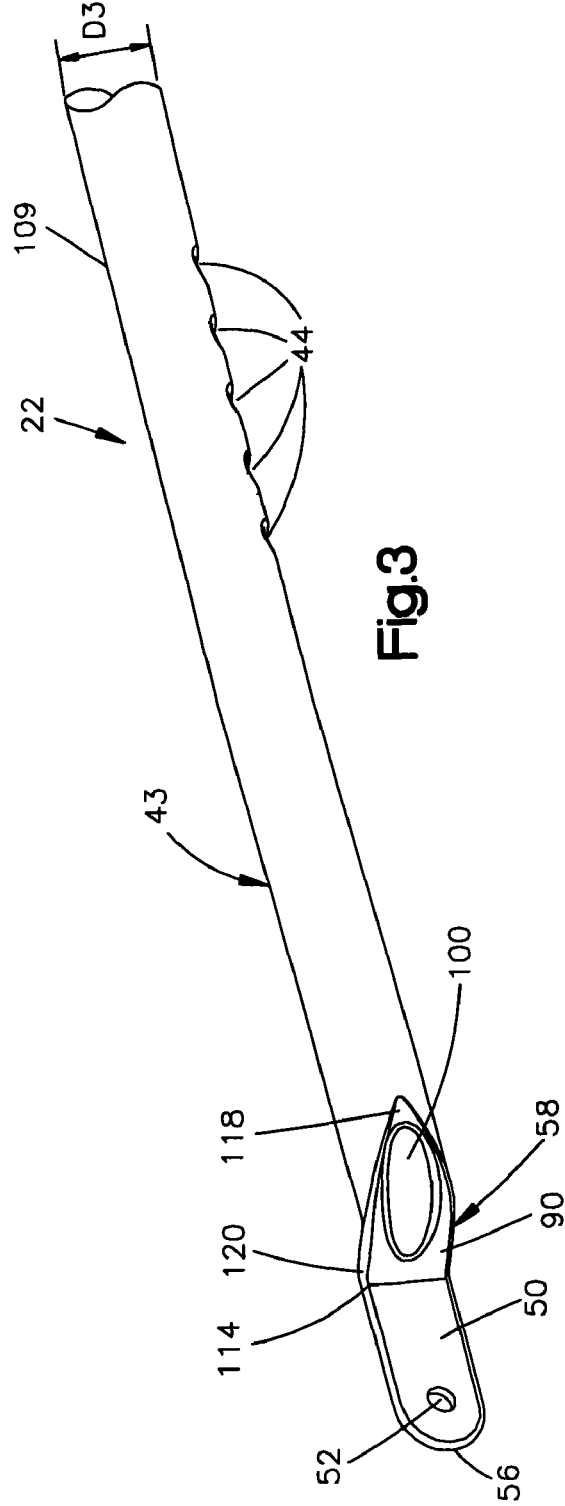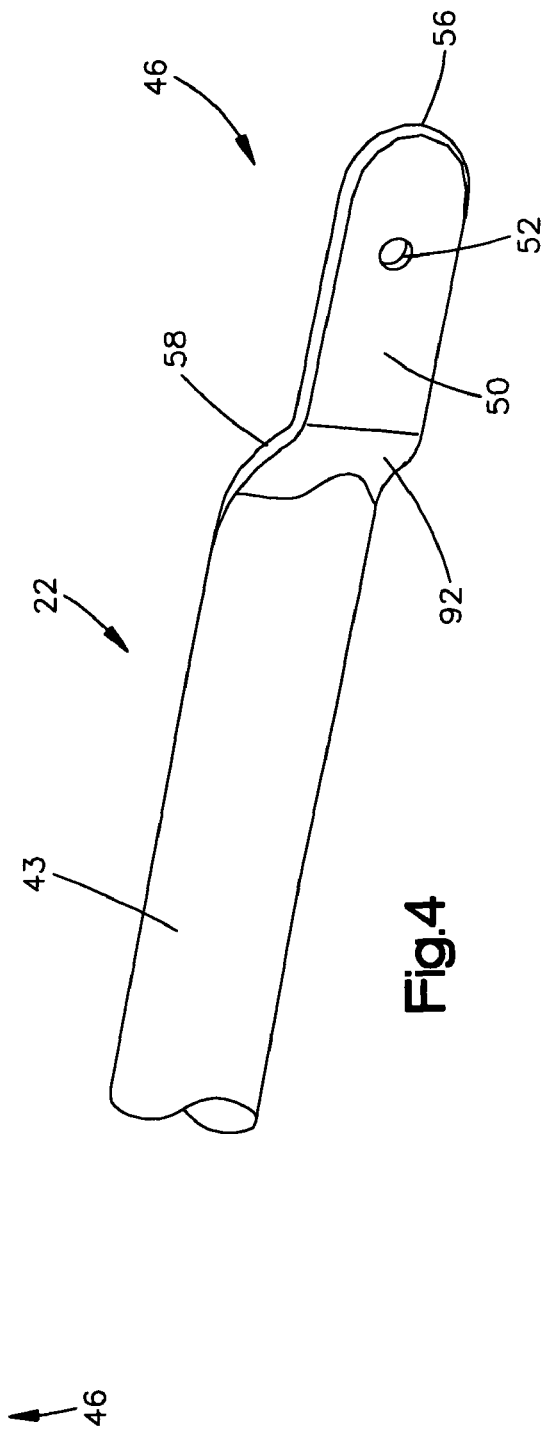

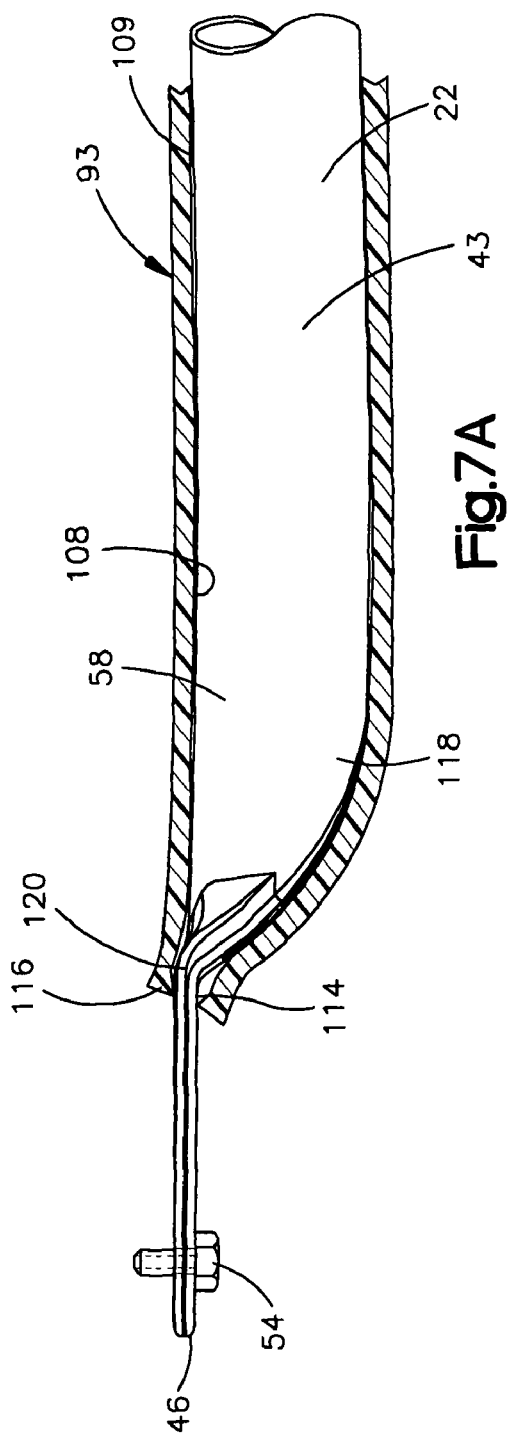
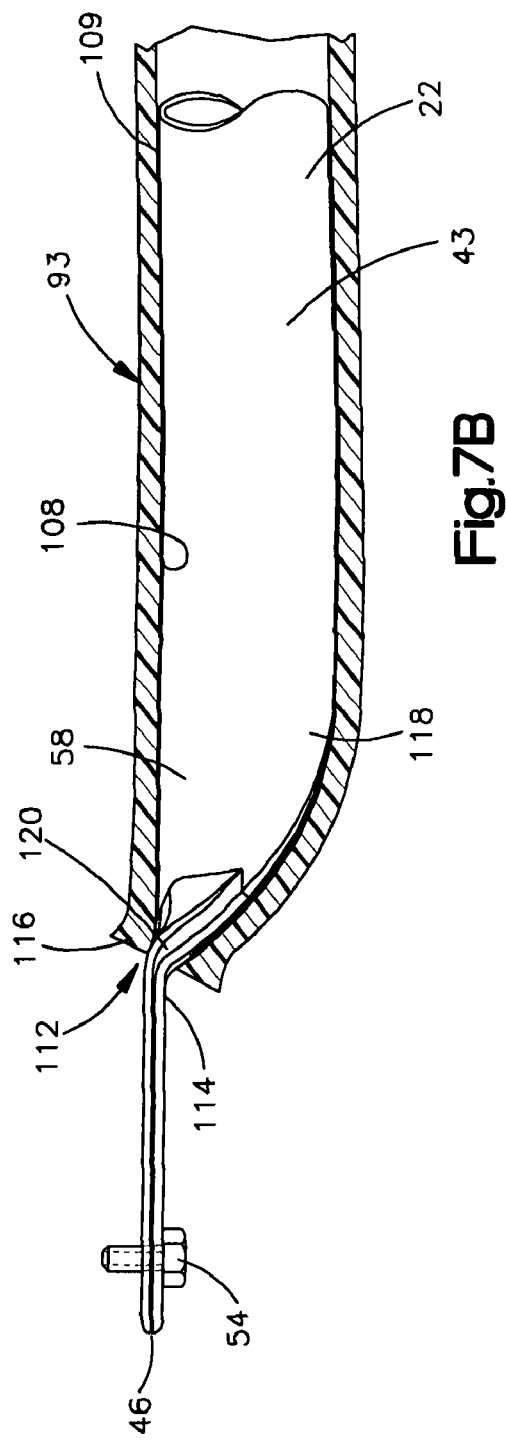

INFLATABLE CURTAIN

FIELD OF THE INVENTION

The present invention relates to an inflatable apparatus for helping to protect a vehicle occupant in the event of a side impact to the vehicle, a vehicle rollover, or both.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates away from the roof of the vehicle downward inside the passenger compartment between a vehicle occupant and the side structure of the vehicle in the event of a side impact or rollover. A known inflatable curtain is inflated from a deflated condition by inflation fluid directed from an inflator to the inflatable curtain.

SUMMARY OF THE INVENTION

The present invention relates to an apparatus for helping to protect an occupant of a vehicle that has a side structure and a roof. The apparatus comprises an inflatable vehicle occupant protection device that is inflatable away from the vehicle roof to a position between the side structure of the vehicle and a vehicle occupant, and a fill tube for delivering inflation fluid to the protection device. The protection device comprises an opening through which the fill tube extends and a portion adjacent the opening that forms a friction fit around the fill tube. The friction fit forms an effective seal for preventing inflation fluid leakage through the opening.

The present invention also relates to an apparatus for helping to protect an occupant of a vehicle. The apparatus includes an inflatable vehicle occupant protection device inflatable to help protect a vehicle occupant. The apparatus also includes a fill tube for delivering inflation fluid to the protection device. The fill tube includes a crimped portion crimped flat to block inflation fluid flow through the crimped portion.

The present invention further relates to an apparatus for helping to protect an occupant of a vehicle. The apparatus includes an inflatable vehicle occupant protection device inflatable to help protect a vehicle occupant. The apparatus also includes a fill tube for delivering inflation fluid to the protection device. The protection device includes an opening through which the fill tube extends. The fill tube includes a tapered portion that forms an interference with a portion of the protection device defining the opening. The interference creates a friction fit between the fill tube and the portions defining the opening. The friction fit forms an effective seal for preventing inflation fluid leakage through the opening.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an apparatus for helping to protect a vehicle occupant illustrating the apparatus in a non-deployed condition in a vehicle, according to the present invention;

FIG. 2 is a schematic view of the apparatus of FIG. 1 in a deployed condition in the vehicle;

FIGS. 3 and 4 are perspective views illustrating portions of a fill tube of the apparatus;

FIG. 7A is a partial sectional view taken generally along line 7A-7A of FIG. 6A;

FIG. 7B is a partial sectional view generally along line 7B-7B of FIG. 6B; and

DESCRIPTION OF EMBODIMENTS

Figure 5:
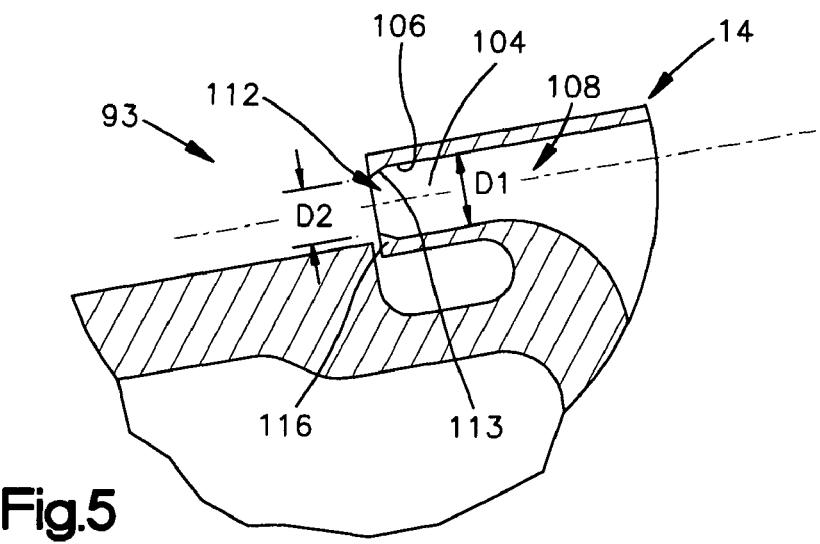
FIG. 5 is a sectional view of a portion of an inflatable vehicle occupant protection device of the apparatus.

Representative of the present invention, FIGS. 1 and 2 illustrate an apparatus 10 for helping to protect occupants 28 of a vehicle 12. The apparatus 10 includes an inflatable vehicle occupant protection device in the form of an inflatable curtain 14. The inflatable curtain 14 has a stored or non-deployed condition, shown in FIG. 1, in which the deflated curtain is folded, rolled, or both folded and rolled, and positioned adjacent the intersection of a side structure 16 and a roof 18 of the vehicle 12.

The vehicle 12 includes an A pillar 70, B pillar 72 and C pillar 74. The inflatable curtain 14 includes a front portion 93 (FIG. 2) that is connected to the A pillar 70 by a tether 80 and means 95, such as a bracket. The inflatable curtain includes a rear portion 94 (FIG. 2) that is connected to the C pillar 74 by a tether 82 and means 97, such as a bracket.

The inflatable curtain 14 is inflatable from the stored position in a direction away from the roof 18 to a deployed position, shown in FIG. 2. In the deployed position, the inflated curtain 14 extends along the side structure 16 and is positioned between the side structure and any occupants 28 of the vehicle 12.

The inflatable curtain 14 can be constructed of any suitable material, such as a woven fabric material. The inflatable curtain 14 may be uncoated, coated with a material, such as a gas impermeable urethane, or laminated with a material, such as a gas impermeable film. The inflatable curtain 14 thus may have a gas-tight or substantially gas-tight construction. Those skilled in the art will appreciate that alternative materials, such as silicone, may also be used to coat or laminate the inflatable curtain 14.

The apparatus 10 also includes an inflation fluid source in the form of an inflator 24. The inflator 24 is actuatable to provide inflation fluid for inflating the inflatable curtain 14. In the illustrated embodiment, the inflator 24 is mounted at the rear portion of the vehicle near the C-pillar 74.

The inflator 24 may be of any suitable construction or configuration. For example, the inflator 24 may contain a stored quantity of pressurized inflation fluid (not shown) in the form of a gas for inflating the inflatable curtain 14. As another example, the inflator 24 could contain a combination of pressurized inflation fluid and ignitable material for heating the inflation fluid, or could be a pyrotechnic inflator that uses the combustion of gas-generating material to generate inflation fluid. As a further example, the inflator 24 could be of any suitable type or construction for supplying a medium for providing inflation fluid for inflating the inflatable curtain 14.

In the illustrated embodiment, the inflator 24 is connected in fluid communication with the inflatable curtain 14 through a conduit or fill tube 22. The fill tube 22 may be constructed of any suitable material, such as metal or plastic. The fill tube 22 has a rear end portion 27 that is connected to the inflator 24, and a main portion 43 positioned in the inflatable curtain 14. The main portion 43 includes a plurality of openings 44 (see FIG. 3) through which inflation fluid is delivered to the curtain 14.

Referring to FIGS. 3 and 4, the fill tube 22 includes a front end portion 46. The front end portion 46 includes an end portion 50 that is crimped or otherwise formed to have a substantially flattened configuration. The crimped portion 50 closes off and blocks inflation fluid flow through the front end portion 46 of the fill tube 22. The crimped portion 50 includes a mounting opening 52 for receiving a fastener 54 (see FIGS. 6A and 6B) for helping to secure the apparatus 10 in the vehicle 12. The mounting opening 52 extends through the crimped portion 50. The crimped portion 50 of the fill tube 22 terminates in a curved front edge 56.

The front end portion 46 also includes a tapered portion 58 that extends between the main portion 43 and the crimped portion 50. As best shown in FIGS. 3 and 4, the tapered portion 58 is configured to offset the crimped portion 50 from the main portion 43 of the fill tube 22. The tapered portion 58 includes an inner portion 90 and an opposite outer portion 92.

The front end portion 46 of the fill tube may undergo one or more manufacturing steps that produce the crimped portion 50 and the tapered portion 58. For example, tooling (not shown), such as a stamp or die, may form the crimped portion 50 and tapered portion 58 from stock tube material (e.g., steel tubing) in a single manufacturing step. In this example, the tooling may be outfitted to punch or pierce the mounting opening 52 in the crimped portion 50 in the same manufacturing step.

Referring to FIGS. 3 and 4, the outer portion 92 of the tapered portion 58 is slightly concave in the area of its transition to the main portion 43 of the fill tube 22. Similarly, the inner portion 90 of the tapered portion 58 is slightly concave in the area of its transition to the main portion 43 of the fill tube 22 and forms a generally oval-shaped recess 100.

Referring to FIG. 5, the front portion 93 of the inflatable curtain 14 includes a channel 104 through which the front end portion 46 of the fill tube 22 extends. The channel 104 includes an inlet 108 having a diameter D1 and an outlet 112 having a diameter D2. A terminal end portion 113 of the inner wall 106 is tapered inward and helps define a stop portion 116. The portion of the channel 104 defined by the terminal end portion 113 thus tapers or reduces from the first, larger diameter D1 at the inlet 108 of the channel 104 and along the length of the channel 104 to the second, smaller diameter D2 at the outlet 112 of the channel 104. When a portion or feature of the inflatable curtain, such as channel 104 is described herein as having a diameter, the diameter is determined and measured when the portion or feature is opened from a flattened condition to a generally rounded condition.

Figure 6A:
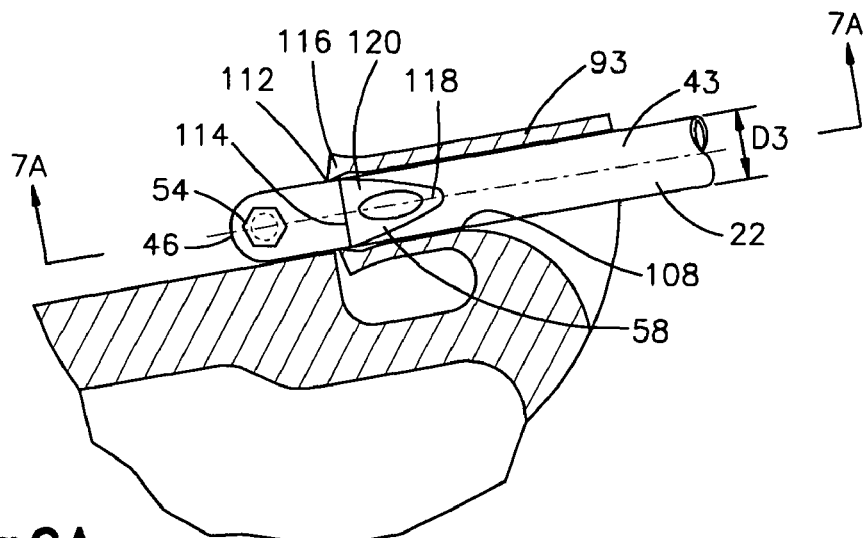
FIG. 6A is a partial sectional view illustrating a front portion of the protection device, a corresponding portion of the fill tube in the non-deployed condition of the apparatus.

The apparatus 10 is assembled by inserting the fill tube 22 into the inflatable curtain 14 and sliding the front end portion 46 of the fill tube 22 through the channel 104. As the front end portion 46 of the fill tube 22 passes through the outlet 112 of the channel 104, an interference fit is established with the stop portion 116. This occurs when the circumferential size or diameter of the front end portion 46 equals the diameter D2. As shown in FIGS. 6A and 7A, this may, for example, occur approximately when the tapered portion 58 reaches the stop portion 116. As the front end portion 46 is moved or urged farther through the channel 104, the interference between the tapered portion 58 and the stop portion 116 increases.

The main portion 43 of the fill tube 22 has an outside diameter D3 that is about equal to or slightly greater than the inner diameter D1 of the inlet 108 and the inner wall 106. This forms an interference that creates a friction fit between the inner wall 106 and the main portion 43 of the fill tube 22. In one particular example configuration, the inner diameter D2 of the inlet 108 and the inner wall 106 may be about 23 mm and the outside diameter D3 of the main portion 43 of the fill tube 22 may be about 24 mm.

Figure 8:
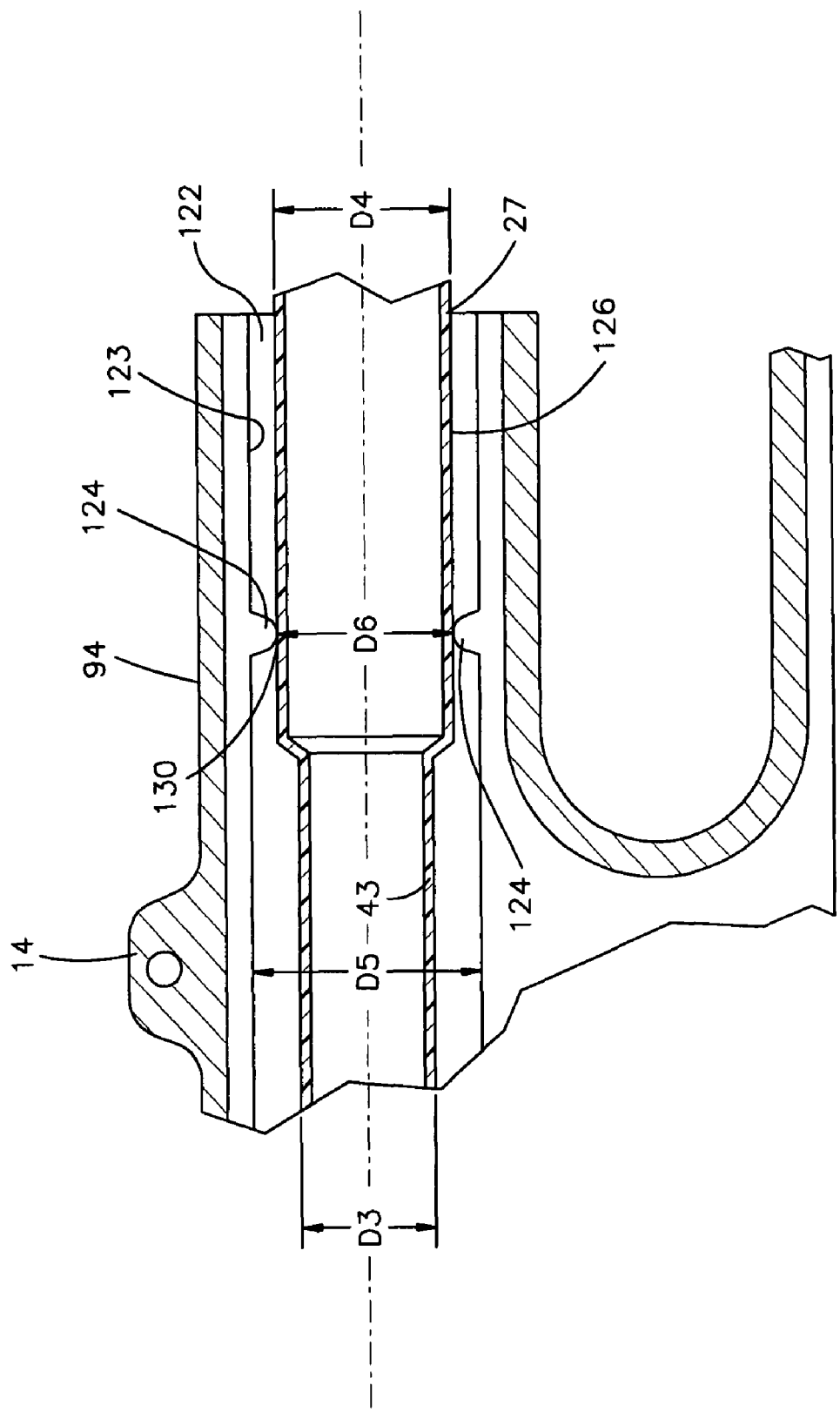
FIG. 8 is a sectional view illustrating a rear portion of the protection device and a corresponding portion of the fill tube.

Referring to FIG. 8, the rear portion 94 of the inflatable curtain 14 includes an inner wall 123 that defines a cylindrical channel 122 having a diameter D5. An integrally formed annular seal portion 124 is formed in one piece with the inner wall 123. The seal portion 124 protrudes inwardly to define an opening 130 with a diameter D6.

The rear end portion 27 of the fill tube 22 tapers at the junction between the rear end portion 27 and the main portion 43. Thus, the rear end portion 27 has a larger diameter D4 than the diameter D3 of the main portion 43. The diameter D6 of the opening 130 is larger than the diameter D3 of the main portion 43 but slightly smaller than the diameter D4 of the rear end portion 27. The fill tube 22 is inserted into the channel 122 and positioned in the channel so that the seal portion 124 engages the rear end portion 27 of the fill tube 22 to create a friction fit around the rear end portion 27 of the fill tube 22. This configuration of the fill tube 22 and rear portion 94 of the inflatable curtain 14 allows the seal portion 124 to move over the main portion 43 but engage the rear end portion 27 to create a friction fit around the rear end portion 27 of the fill tube 22 during installation of the inflatable curtain 14.

Alternatively, the channel may not have a seal portion and instead have its diameter D5 be larger than the diameter D3 of the main portion 43 but slightly smaller than the diameter D4 of the rear end portion 27. In this embodiment, the inner wall 123 of the rear portion 94 of the inflatable curtain 14 would engage the rear end portion 27 to create the friction fit around the rear end portion 27.

In the stored condition, the apparatus 10 is supported in the vehicle 12 by known means, such as hooks, brackets, or fasteners, that connect the inflatable curtain 14, inflator 24, fill tube 22, or any combination thereof to the vehicle. For example, as shown in FIGS. 1 and 2, brackets 30 encircle and clamp onto the fill tube 22 and the inflatable curtain 14 to help secure the curtain and fill tube to the vehicle 12. Fasteners 34 secure the brackets 30 to the vehicle. In addition, the fastener 54 mounts the front end portion 46 of the fill tube 22 to the vehicle 12.

Referring to FIGS. 6A and 7A, in the stored condition, the front end portion 46 of the fill tube 22 extends through the channel 104 of the front portion 93 of the inflatable curtain 14 such that the outlet 112 of the channel is positioned forward of and adjacent to the tapered portion 58. In this position, the stop portion 116 of the inflatable curtain 14 surrounds the rear end 114 of the front end portion 46 of the fill tube 22. As seen in FIG. 7A, there is sufficient slack in the inflatable curtain 14 at the outlet 112 of the channel 104 to allow the inflatable curtain 14 to slide along the fill tube 22 in the rearward direction. The inner wall 106 that defines the inlet 108 of the channel 104 engages the outer surface 109 of the main portion 43 of the fill tube 22. The inner wall 106 defining the inlet 108, which has the smaller diameter D1, stretches around the larger outer diameter of the main portion 43 of the fill tube 22 to create a friction fit with the main portion 43 of the fill tube 22. The friction fit forms an effective seal between the main portion 43 of the fill tube 22 and the inflatable curtain 14 at the inlet 108 to substantially prevent inflation fluid leakage through the channel 104. By "effective seal", it is meant to describe a seal sufficient to prevent an amount of leakage of inflation fluid from the inflatable curtain 14 that would interfere with proper inflation and deployment of the curtain.

Also, in the stored condition, the seal portion 124 engages the outer surface 126 of the rear end portion 27 of the fill tube 22. The inflatable curtain 14 is made of a fabric material with sufficient elasticity so that the seal portion 124 stretches around the rear end portion 27 of the fill tube 22 and then constricts to create a friction fit with the rear end portion 27 of the fill tube 22. The friction fit forms an effective seal between the rear end portion 27 of the fill tube 22 and seal portion 124 to substantially prevent inflation fluid leakage through the channel 122.

Upon sensing the occurrence of an event for which inflation of the inflatable curtain 14 is desired, such as a side impact, a vehicle rollover, or both, a sensor 60 (FIGS. 1 and 2) provides an actuation signal to the inflator 24 via lead wires 62. Upon actuation of the inflator 24, inflation fluid is directed through the fill tube 22 into the inflatable curtain 14. The inflatable curtain 14 inflates and deploys under the pressure of inflation fluid provided by the inflator 24 from the stored position of FIG. 1 to the deployed position of FIG. 2.

In the deployed position, the inflatable curtain 14 is positioned between the side structure 16 and any occupants 28 of the vehicle 12. The inflatable curtain 14, when inflated, extends fore and aft in the vehicle 12 along the side structure 16 and may cover or at least partially cover the side windows 20. The inflatable curtain 14 may also cover portions of the A pillar 70, B pillar 72 and C pillar 74 of the vehicle 12. The inflatable curtain may include several non-inflatable connections 132 that help define inflatable chambers 134 of the curtain 14.

During inflation of the inflatable curtain, the inflatable curtain 14 contracts lengthwise such that the front portion 93 of the inflatable curtain moves rearwardly along the fill tube 22 and the rear portion 94 of the inflatable curtain moves forwardly along the fill tube 22. This lengthwise contraction further pulls the inner wall 106 of the curtain 14 around the main portion 43 of the fill tube 22 to further the friction fit to better form an effective seal.

Figure 6B:
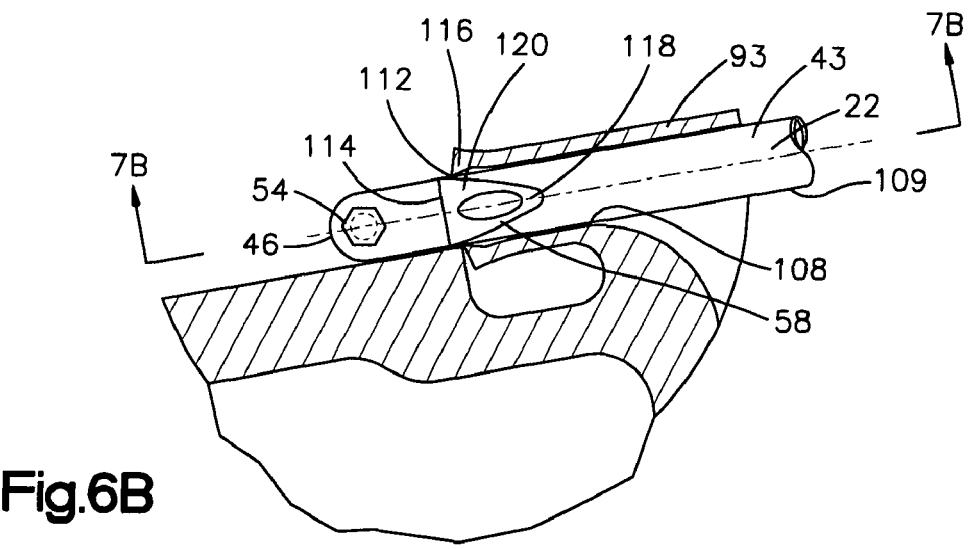
FIG. 6B is a partial sectional view similar to FIG. 6A illustrating the fill tube and protection device in the deployed condition of the apparatus.

Also, during the inflation of the inflatable curtain 14, the terminal end portion 113 moves rearwardly along the fill tube 22 until the entire stop portion 116 tightly engages the front end 120 of the tapered portion 58 to stop further rearward movement of the curtain 14 as depicted in FIGS. 6B and 7B. At this location, the front end 120, which has a larger perimeter than the rear end 114 of the front end portion 46, takes up the slack of the inflatable curtain 14 so that the curtain 14 cannot slide farther rearward along the tapered portion 58 because the tapered portion has an increasingly larger perimeter along its length. Thus, no additional clamps or other such devices are needed to seal the curtain 14 around the fill tube 22 at the channel 104.

The main portion 43 could also have a raised annular portion with a larger diameter than the diameter D3. Upon inflation of the inflatable curtain 14, the inner wall 106 that defines the inlet 108 would engage the raised portion to increase the friction fit around the main portion 43. Likewise, the rear end portion 27 could have a raised annular portion that would engage the seal portion 124 to increase the friction fit around the rear end portion 27.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle, the apparatus comprising:
   an inflatable vehicle occupant protection device inflatable to help protect a vehicle occupant; and
   a fill tube for delivering inflation fluid to the protection device, the protection device comprising an opening through which the fill tube extends and a tapered stop portion adjacent the opening that forms a friction fit around the fill tube, the friction fit forming an effective seal for preventing inflation fluid leakage through the opening.

2. The apparatus recited in claim 1, wherein the fill tube has an outer periphery, the tapered stop portion having an inner periphery that forms an interference with the outer periphery, the interference creating the friction fit with the fill tube.

3. The apparatus recited in claim 1, wherein the protection device is configured to contract lengthwise when inflated, the lengthwise contraction urging the tapered stop portion of the protection device adjacent the opening onto the portion of the fill tube to increase the friction fit.

4. The apparatus recited in claim 1, wherein the apparatus is free from clamps for forming the seal for preventing inflation fluid leakage through the opening.

5. The apparatus recited in claim 1, wherein the protection device is inflatable away from a roof of the vehicle to a position between a side structure of the vehicle and a vehicle occupant.

6. The apparatus recited in claim 1, wherein the protection device includes a channel in fluid communication with an inflatable volume of the protection device, the channel terminating with the opening.

7. The apparatus recited in claim 6, wherein the tapered stop portion limits relative axial movement of the fill tube and the protection device, the tapered stop portion comprising an inner surface of the protection device tapered inwardly to reduce the effective diameter of the channel.

8. The apparatus recited in claim 1, wherein the fill tube has a first end portion connected to the inflator and an opposite second end portion that extends through the opening in the protection device.

9. The apparatus recited in claim 8, wherein the second end portion of the fill tube comprises a tapered portion that cooperates with the tapered stop portion of the protection device to help limit relative axial movement of the fill tube and the protection device.

10. The apparatus recited in claim 8, wherein the first end portion of the fill tube extends through a channel of the protection device, the channel having a first diameter, the protection device comprising an annular seal portion surrounding a portion of the channel and having a second diameter less than the first diameter, the annular seal portion forming a friction fit around the first end portion of the fill tube, the friction fit forming an effective seal for preventing inflation fluid leakage through the second channel.

11. The apparatus recited in claim 10, wherein the first end portion of the fill tube has a diameter that is larger than the diameter of the remainder of the fill tube, the larger diameter helping to create an interference with the annular seal portion to help form the effective seal between the protection device and the first end portion of the fill tube.

12. The apparatus recited in claim 8, wherein the second end portion comprises a crimped portion that blocks inflation fluid flow through the second end portion.

13. The apparatus recited in claim 12, further comprising a fastener receiving aperture extending through the crimped portion for receiving a fastener for helping to secure the fill tube to the vehicle.

14. The apparatus recited in claim 12, wherein the crimped portion has a generally flattened configuration, the tapered portion extending between the crimped portion and a non-crimped portion of the fill tube.

15. The apparatus recited in claim 14, wherein the tapered portion of the fill tube offsets the crimped portion from the non-crimped portion.

16. Apparatus for helping to protect an occupant of a vehicle, the apparatus comprising:

an inflatable vehicle occupant protection device inflatable to help protect a vehicle occupant; and a fill tube for delivering inflation fluid to the protection device, the fill tube comprising a main portion and a crimped portion, the crimped portion being offset from the main portion and extending beyond an outer diameter of the main portion and being crimped flat to block inflation fluid flow through the crimped portion.

17. The apparatus recited in claim 16, further comprising an aperture extending through the crimped portion for receiving a fastener for securing the fill tube to the vehicle.

18. The apparatus recited in claim 16, wherein the crimped portion comprises a terminal end portion of the fill tube.

19. Apparatus for helping to protect an occupant of a vehicle, the apparatus comprising:

an inflatable vehicle occupant protection device inflatable to help protect a vehicle occupant; and a fill tube for delivering inflation fluid to the protection device, the protection device comprising an opening through which the fill tube extends, the fill tube comprising a tapered portion that forms an interference with a portion of the protection device defining the opening, the interference creating a friction fit between the fill tube and the portions defining the opening, the friction fit forming an effective seal for preventing inflation fluid leakage through the opening.

20. The apparatus recited in claim 19, wherein the fill tube includes a crimped portion crimped flat to block inflation fluid flow through the crimped portion, the tapered portion extending between the crimped portion and non-crimped portions of the fill tube.

21. The apparatus recited in claim 20, wherein the crimped portion comprises a terminal end portion of the fill tube.

22. The apparatus recited in claim 20, wherein the tapered portion of the fill tube offsets the crimped portion from the non-crimped portion.

* * * * *